INVENTOR
Rolf Kung
BY Pierce, Scheffler & Parker
ATTORNEYS

Rolf Kung

United States Patent Office 3,525,260
Patented Aug. 25, 1970

3,525,260
ARRANGEMENT FOR CONTACTLESS MEASUREMENT OF THE TEMPERATURE OF A MOVING WIRE
Rolf Kung, Nussbaumen, Switzerland, assignor to Aktiengesellschaft Brown, Boveri & Cie, Baden, Switzerland, a joint-stock company
Filed Dec. 4, 1967, Ser. No. 687,617
Claims priority, application Switzerland, Dec. 20, 1966, 18,181/66
Int. Cl. G01j 5/16; G01k 13/06
U.S. Cl. 73—355      1 Claim

ABSTRACT OF THE DISCLOSURE

An arrangement for a so-called contactless measurement of the temperature of a moving filament or wire comprises a thermoelectric unit such as a thermopile, bolometer, or photocell mounted in a housing closely adjacent to but not touching the moving wire which passes through a slot in the housing so as to effect heat transfer from the wire to the thermoelectric unit by radiation. The housing is provided with a heater element and any instantaneous temperature difference between the wire and housing as reflected by an output from the thermoelectric unit is used to vary the temperature of the housing to match that of the wire, or alternatively to heat the wire so that its temperature will match that of the housing which is maintained at a desired level.

---

This invention relates to an improved device for the contactless measurement of the temperature of moving filaments or wires by means of thermo-electric apparatus.

In the following description, the term "thermo-electric apparatus" means an arrangement in which the thermal radiation affects electrical quantities of any kind, such as currents, voltages or resistances.

For measuring the temperature of moving filaments or wires in known devices and apparatus, a sliding contact has been effected between the moving wire and the junctions of thermo-elements so that heat was transferred directly from the wire to the thermo-element. The temperature could then be determined from the voltage generated across the thermo-element.

In order to reduce in these arrangements the frictional heat produced by the contact, the wire was made to run in rollers, forming themselves the thermo-elements; however, even then there occur measuring errors, because the thermal capacitance of the roller arrangement removes heat. A particular disadvantage was the dependence between the measuring error and the filament velocity which was subject to substantial fluctuations and could not be predicted. In addition, the effects of the ambient air could not be eliminated, because this air is carried along by the moving filaments.

Hence, there arose the requirements of carrying out such measurements as far as possible without frictional losses. This is possible only by means of contactless measurements. Such measurements have hitherto been made with pyrometers for higher temperatures, using the thermal radiation from the wire for the measurement. However, with such pyrometers it has not been possible to obtain a sufficient precision, especially with lower temperatures and with small wire cross-sections.

According to the invention, it is proposed to guide the wire without contact alongside a thermo-electric measuring apparatus which is mounted in and is in close thermal contact with a housing, and the voltage generated in the element by the thermal radiation of the wire or filament is applied to a control circuit including an amplifier and heating coil arranged and adapted to adjust the temperature of the housing to equal that of the filament, and to provide an indicator indicating the temperature of the housing. Owing to the operation of the control circuit the indicated temperature is equal to the temperature of the wire or filament. The thermo-electric instruments are preferably known thermopiles comprising several soldered junctions of which some are heated by the object to be measured so-called (hot junctions) and others are subjected to the ambient temperature or the temperature of the surrounding housing (so-called cold junctions). The resulting temperature difference between the hot and the cold junctions generates in such a pile an electrical voltage and this voltage is a measure of the temperature of the object, with constant ambient temperature.

It is also possible to use two photocells which respond to thermal radiation and generate a voltage as a function of the temperature, or bolometer resistances with a temperature-sensitive resistance, one photocell or resistance being exposed to radiation from the wire or filament and the other to radiation from the housing or a member at the temperature of the housing; bolometers can be connected to the control circuit by a bridge circuit while photocells can give a voltage difference which is applied to the control circuit.

The invention will be further described, with reference to the accompanying drawings which illustrate various embodiments of the invention. In the drawings.

Figure 1:
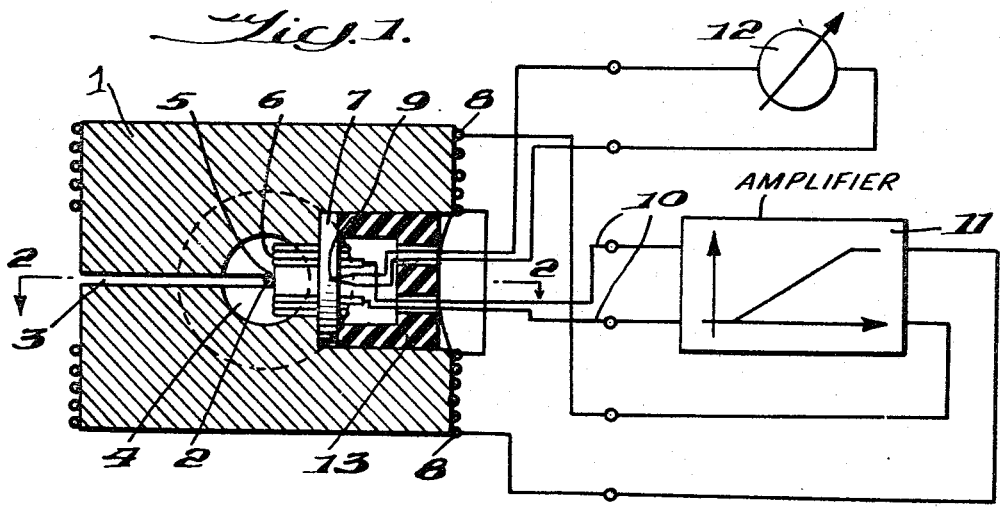
FIG. 1 is a combined electrical schematic and structural view of one embodiment of the invention utilizing a thermopile as the heat sensing element, the structure part being shown in horizontal section.
Figure 2:
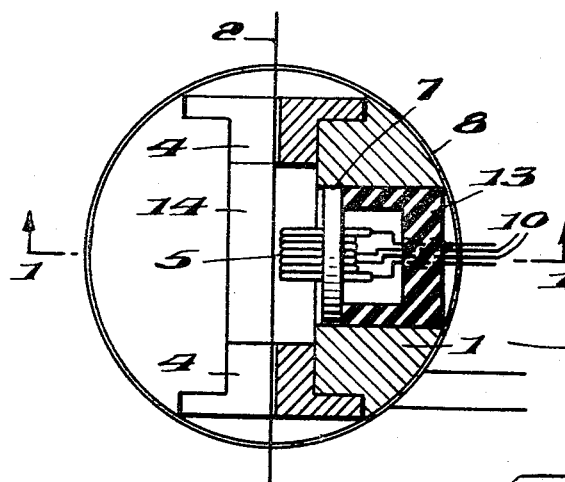
FIG. 2 is a vertical sectional view on line 2—2 of FIG. 1.

With reference now to the drawings, FIGS. 1 and 2 show the housing 1 of the measuring apparatus, the housing being in the form of an essentially solid metallic body, and the filament or wire 2, introduced through a slot 3 and passing through the housing from one side thereof to the other by way of guides 4. The width of the slot which extends inwardly from the periphery of the body 1 and intersects a chamber 14 need exceed that of the wire or filament only by a fraction of the diameter of the latter.

Adjacent to the wire 2, but not making contact therewith, is a thermopile with hot junctions 5, and cold junctions 6 which assume the temperature of the housing. The individual rods of the thermopile are held in a plate 7, which forms a good thermal connection with the housing 1. The electrical output leads of the thermopile are shown at 10. They connect the thermopile with an amplifier 11 whose output goes to a heater winding 8, which heats the housing so long as the output of the amplifier carries a voltage. A temperature sensing element 9, such as a thermo-element or a thermometer measures the temperature of the housing and transmits this value in the form of an electrical voltage to the measuring instrument 12. 13 is an insulating member through which the leads pass. The wire 2 passes through the cylindrical temperature measuring chamber within which the thermopile is located, the inner surface of which is preferably highly polished in order to reflect the radiation of the wire to the hot junctions of the thermopile. At the upper and lower ends of this cylindrical chamber 14 are the guides 4 for leading the wire through slot 3 which as previously explained is only slightly wider than the diameter of the wire.

The operation of the device is as follows:

Let it be assumed that the wire 2 is hotter than the housing 1. The hot junctions will then have a higher temperature than the cold junctions. This temperature difference produces in the thermopile an electrical voltage which is amplified by the amplifier 11 which passes current through the heater winding 8. In consequence, the housing 1 is heated and the temperature difference between the hot and cold junctions is reduced. The voltage drops, and the current flowing through the heater winding is reduced. This continues until the temperatures of the junctions are equal; then the housing has exactly the temperature of the wire. The housing temperature can be measured easily by means of the thermo-element 9 and the voltmeter 12 to which it is connected, the voltmeter being calibrated in degrees. Thus, the temperature of the wire is transmitted to the housing through the control circuit, hot junctions 5, amplifier 11, heater winding 8, housing 1, and the cold junction 6, and the housing temperature can then be taken as a measurement of the wire temperature; in other words, a closed control loop is employed. Instead of the thermo-element one may utilize an arrangement of photoelements which are influenced by the heat radiation from the wire and housing, respectively.

Figure 3:
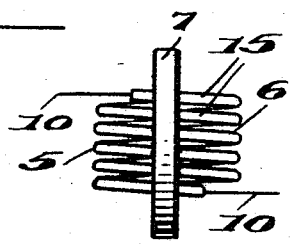
FIGS. 3 and 4 are views in front and side elevations respectively of a detail showing a thermo-pile structure which is compensated.
Figure 4:
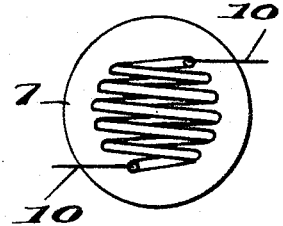

The measuring precision can be further improved by improving the thermal transfer efficiency between the thermopile and the housing. To this end, two thermopiles connected electrically in series opposition, i.e. with their polarities opposing one another can be used, or one can use a compensated thermopile of the type shown in FIGS. 3 and 4. The plate 7 in which the rods 15 of the thermopile are fitted is here made of insulating material. The thermo-elements are mounted at both ends of the rods; reference numeral 5 again indicates the hot junctions and 6 the cold junctions. The rods are electrically connected in series so that the thermo-electrical voltages are opposite. The outputs 10 then carry the voltage differences between the hot junction and cold junction voltages.

Figure 5:
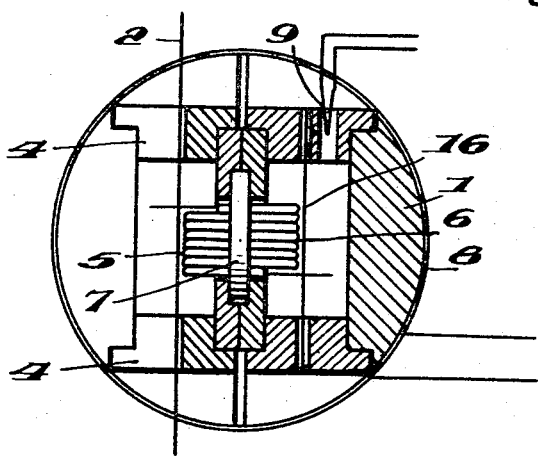
FIG. 5 is a sectional view of the device which shows the installation details of the compensated thermopile structure illustrated in FIGS. 3 and 4.

FIG. 5 shows in greater detail the installation of such a compensated thermopile. The hot junctions 5 are located in the immediate vicinity of wire 2. Opposite the cold junctions 6, there is a further, fixed wire 16 which is in direct thermal connection with the housing 1. Thus, the hot junctions are affected by the temperature of the moving wire 2, and the cold junctions by that of the fixed wire 16, and hence of the housing. The housing temperature and hence the temperature of wire 2 is as before measured with the thermo-element 9.

Figure 6:
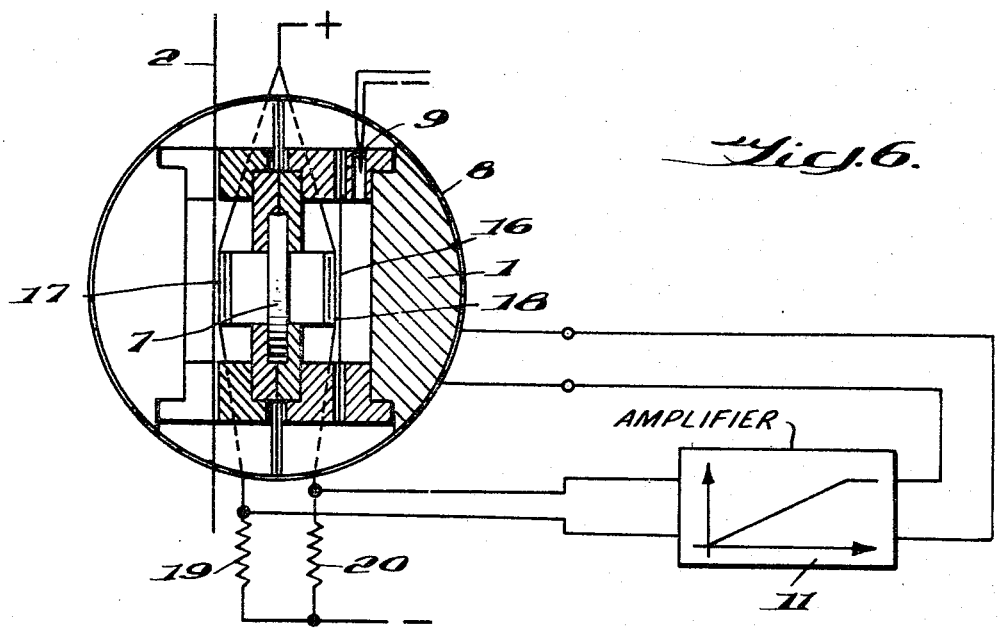
FIG. 6 is a combined electrical schematic and structural view in section of a somewhat different embodiment of the invention utilizing a bolometer arrangement as the heat sensing element.

FIG. 6 shows another embodiment, operating with bolometer resistors. The construction is similar to that of FIG. 5 and includes again the auxiliary fixed wire 16 for transmitting the temperature of the housing. The mounting of the temperature-detectors is similar to FIG. 5. However, instead of thermopiles, there are provided bolometer resistors 17 and 18, i.e., resistors responsive to radiant heat. These bolometer resistors form with resistors 19 and 20 a measuring bridge. The bridge input diagonal terminals receive a D.C. voltage (±). The bridge output diagonal terminals are connected to amplifier 11 which receives a voltage only in the case of an unbalance across the bridge. This voltage is amplified and applied to the heater winding 8. With equal temperatures of housing and wire, the voltage at the bridge output and hence also in the amplifier is zero. With a temperature difference, however, a current will flow so that the temperature of the housing is raised until it corresponds to that of the wire.

Figure 7:
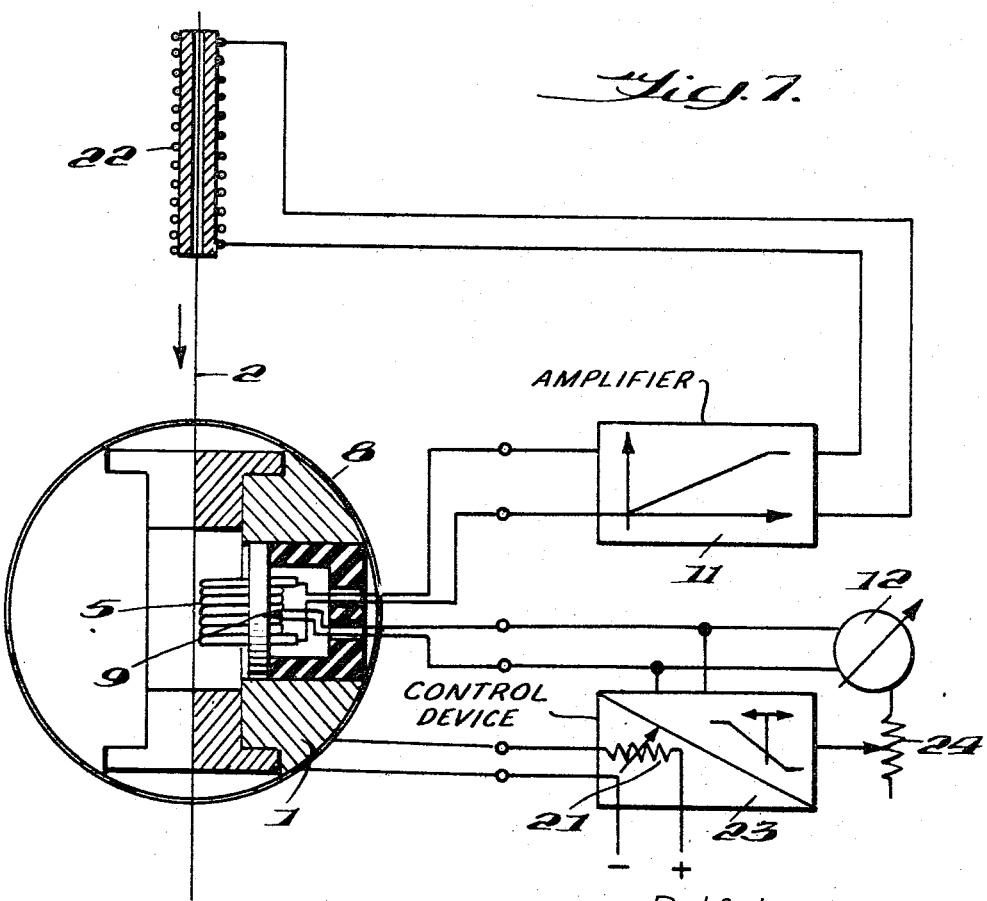
FIG. 7 is a view similar to FIG. 1 illustrating an application of the wire temperature measuring device for controlling the temperature of the wire.

FIG. 7 shows yet another embodiment of the invention, in which the measuring arrangement is used to raise the temperature of the filament of wire 2 to a required level. To this end, the circuitry of the FIG. 1 arrangement has been somewhat modified. In this case, the temperature of the housing 1 is not changed, but that of the wire is altered until the two temperatures are equal. The temperature of the housing is adjusted to a required value by means of a closed control loop provided with a reference voltage source 24, which brings a control device 23 to the required value. The actual temperature of the housing is measured by a thermo-element 9 and shown on the instrument 12. By means of the control device 23, a resistor 21 is adjusted so that the current in the heater coil 8 increases or decreases in accordance with the difference between the measured and the preselected temperature, causing the actual temperature of the housing to change until it has the required nominal value. Inaccuracies caused by external temperature influences and by the applied voltage can be continuously eliminated. In order to ensure that also the wire 2 assumes the same temperature, there is a further closed control loop in which the temperature difference between wire and housing is applied through the thermopile, in the form of an electrical voltage, to the amplifier 11, whose output voltage is applied to a heater coil 22 which raises the temperature of the wire to the required value. Also this temperature is adjusted continuously to the required value which corresponds to the housing temperature. In this way, the filament can be brought to the required temperature by means of contactless control and measurement.

These arrangements do not in practice affect the wire or filament itself, and enable its temperature to be measured or controllel very accurately within fractions of degrees, and even with small diameters. Also the air surrounding the wire or filament is not carried along because it cannot penetrate through the narrow slot into the measuring chamber 14, so that the result cannot be falsified by this air. The narrow slots hold back the air even with larger diameters of the wire, e.g. of the order of 0.5 mm.

I claim:

1. In an arrangement for contactless measurement of the temperature of a moving continuous filament such as a wire, the combination comprising a housing member constituted by an essentially solid metallic body, means providing a temperature measuring chamber within said body and which encloses a length of the filament passing through said body, a thermoelectric unit mounted within said temperature measuring chamber, the surface of said measuring chamber being polished for reflecting radiation from the moving filament to said thermoelectric unit, means providing a slot through said body from one side thereof to the other, said slot extending inwardly from the periphery of said body to and intersecting said measuring chamber and through which said movable filament is inserted into said body and into said measuring chamber, the width of said slot being not appreciably greater than the width of said filament so as to substantially exclude entrainment of air into said slot along with the filament, and guide means for maintaining said filament in a position closely adjacent to but not contacting said thermoelectric unit while passing through said measuring chamber.

References Cited

UNITED STATES PATENTS

| | | | |
|---|---|---|---|
| 2,305,396 | 12/1942 | Volochine | 73—355 |
| 2,785,860 | 3/1957 | Harrison et al. | 73—361 XR |
| 2,811,856 | 11/1957 | Harrison | 73—355 |
| 3,137,170 | 6/1964 | Astheimer | 73—355 |
| 3,287,977 | 11/1966 | Marshall et al. | 73—359 |
| 3,332,285 | 7/1967 | Cook | 73—359 |
| 3,354,720 | 11/1967 | Hager et al. | 73—355 |
| 3,430,492 | 3/1969 | Matsumoto et al. | 73—361 |

FOREIGN PATENTS 1,433,920 France.

LOUIS R. PRINCE, Primary Examiner

F. SHOON, Assistant Examiner

U.S. Cl. X.R.

73—359, 361